(12) United States Patent
Ruiz et al.

(10) Patent No.: US 10,487,963 B2
(45) Date of Patent: Nov. 26, 2019

(54) CLAMP ASSEMBLY AND METHOD OF CLAMPING

(71) Applicant: Hamilton Sundstrand Corporation, Charlotte, NC (US)

(72) Inventors: Gabriel Ruiz, Granby, CT (US); James Streeter, Torrington, CT (US); Ryan Matthew Kelley, Bloomfield, CT (US); Michael Zager, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/925,276

(22) Filed: Mar. 19, 2018

(65) Prior Publication Data

US 2019/0285201 A1   Sep. 19, 2019

(51) Int. Cl.
| | |
|---|---|
| F16L 3/237 | (2006.01) |
| F16L 3/14 | (2006.01) |
| F16L 3/00 | (2006.01) |
| F16L 3/26 | (2006.01) |
| F16L 21/06 | (2006.01) |
| F16L 21/05 | (2006.01) |

(52) U.S. Cl.
CPC ............... *F16L 3/237* (2013.01); *F16L 3/00* (2013.01); *F16L 3/14* (2013.01); *F16L 3/26* (2013.01); *F16L 21/05* (2013.01); *F16L 21/06* (2013.01)

(58) Field of Classification Search
CPC ......... F16L 3/237; F16L 21/06; F16L 21/002; F16L 21/00; F16L 21/03; F16L 21/05; F16L 3/26; F16L 3/14; F16L 3/00; F16L 3/01; F16L 3/02; F16L 3/08; F16L 3/10; F16L 3/1033; F16L 3/1041; F16L 3/1075; F16L 3/1083; F16L 3/1091; F16L 23/00

USPC ... 248/68.1, 67.5, 67.7, 73, 74.1, 74.2, 74.3, 248/74.4
See application file for complete search history.

(56) References Cited

U.S. PATENT DOCUMENTS

| | | | |
|---|---|---|---|
| 1,051,245 A * | 1/1913 | Marchal ................ | A41B 3/08 24/329 |
| 2,012,562 A | 8/1935 | Gunn | |
| 2,354,919 A | 8/1944 | Lockwood | |
| 4,273,465 A | 6/1981 | Schoen | |
| 4,790,574 A | 12/1988 | Wagner et al. | |

(Continued)

FOREIGN PATENT DOCUMENTS

| | | |
|---|---|---|
| CN | 103557374 B | 8/2016 |
| EP | 2594835 A1 | 5/2013 |

OTHER PUBLICATIONS

Extended European Search Report for European Application No. 19163773.5 dated Jul. 8, 2019, 8 pages.

*Primary Examiner* — Nkeisha Smith
(74) *Attorney, Agent, or Firm* — Kinney & Lange, P.A.

(57) ABSTRACT

A clamp assembly includes a first arm, a second arm, a hinge, and a fastening arrangement. The first arm and the second arm each include a hinge end, a free end, a web between the hinge end and the free end, a curved portion between the hinge end and the web, and a curved portion between the free end and the web. The hinge pivotably connects the hinge ends. The fastening arrangement is configured to connect the free ends when the clamp assembly is in a closed position. The curved portions are configured to encircle a first structure and a second structure when the clamp assembly is in the closed position.

19 Claims, 3 Drawing Sheets

(56) References Cited

U.S. PATENT DOCUMENTS

| | | | |
|---|---|---|---|
| 5,115,542 A * | 5/1992 | Gehres | F16L 3/2235 24/339 |
| 5,234,185 A * | 8/1993 | Hoffman | B60H 1/00571 248/56 |
| 5,433,486 A * | 7/1995 | Mannl | F16L 13/11 285/114 |
| 5,454,606 A | 10/1995 | Voss et al. | |
| 5,941,483 A * | 8/1999 | Baginski | F16L 3/22 248/68.1 |
| 6,435,565 B2 | 8/2002 | Potts et al. | |
| 6,758,500 B2 * | 7/2004 | Lehnhardt | F16L 21/06 285/111 |
| 7,677,611 B2 * | 3/2010 | Holzheu | F16L 23/20 277/602 |
| 8,141,912 B2 | 3/2012 | Nyhus | |
| 8,985,531 B2 * | 3/2015 | Wood | B22F 3/1055 174/93 |
| 9,534,715 B2 * | 1/2017 | Beagen, Jr. | F16L 21/065 |
| 9,556,989 B2 | 1/2017 | O'Neil et al. | |
| 9,726,310 B2 * | 8/2017 | Gibb | F16L 17/04 |
| 9,857,689 B2 * | 1/2018 | Wu | F16L 3/01 |
| 2003/0223188 A1 * | 12/2003 | Ha | F16M 11/10 361/679.06 |
| 2005/0116122 A1 * | 6/2005 | Nakanishi | F16L 3/223 248/68.1 |
| 2007/0267868 A1 * | 11/2007 | Holzheu | F16L 23/20 285/368 |
| 2010/0327576 A1 * | 12/2010 | Linhorst | F16L 23/06 285/38 |
| 2011/0315830 A1 * | 12/2011 | Eshima | H02G 3/32 248/74.1 |
| 2012/0056045 A1 * | 3/2012 | Franta | B65H 57/003 248/49 |
| 2017/0122463 A1 * | 5/2017 | Vaccaro | F16L 3/1075 |
| 2018/0080579 A1 * | 3/2018 | Costigan | H04Q 1/06 |
| 2018/0216754 A1 * | 8/2018 | Ciasulli | F16L 3/1016 |

* cited by examiner

CLAMP ASSEMBLY AND METHOD OF CLAMPING

BACKGROUND

The present disclosure relates to clamps, and in particular, to V-band clamps.

Within an aircraft, installation of components may require connection to other components via clamping. As such, connecting aircraft components includes fitting clamps into the spaces surrounding such components. Clamps may also need to be able to withstand harsh temperature and pressure conditions. For example, aircraft components can be connected using V-band clamps. However, V-band clamps may be difficult to install for some applications due to space or access limitations.

SUMMARY

A clamp assembly includes a first arm, a second arm, a hinge, and a fastening arrangement. The first arm includes a first hinge end, a first free end, a first web between the first hinge end and the first free end, a first curved portion between the first hinge end and the first web, and a second curved portion between the first free end and the first web. The second arm includes a second hinge end, a second free end, a second web between the second hinge end and the second free end, a third curved portion between the second hinge end and the second web, and a fourth curved portion between the second free end and the second web. The hinge pivotably connects the first hinge end to the second hinge end. The fastening arrangement is configured to connect the first free end to the second free end when the clamp assembly is in a closed position. The first curved portion and the third curved portion are configured to encircle a first structure when the clamp assembly is in the closed position and the second curved portion and the fourth curved portion are configured to encircle a second structure when the clamp assembly is in the closed position.

A method of clamping axially aligned portions of a first structure and axially aligned portions of a second structure includes separating a first free end of a first arm and a second free end of a second arm of a hinged clamp assembly to place the clamp assembly in an open position, positioning the first arm and the second arm of the clamp assembly in the open position around flanges of a first tube and a second tube of the first structure and around flanges of a third tube and a fourth tube of the second structure, the second structure being spaced from the first structure, joining the first free end and the second free end together such that a first curved portion of the first arm and a third curved portion of the second arm encircle the first structure and a second curved portion of the first arm and a fourth curved portion of the second arm encircle the second structure, placing the clamp assembly in a closed position, and connecting the first free end to the second free end at a fastening arrangement.

DETAILED DESCRIPTION

In general, the present disclosure describes a double V-band clamp, or clamp assembly, that has two rings between a hinge and a bolt, or other fastening arrangement, to join flanges of a first upper aircraft component, or first structure, and flanges of a second lower aircraft component, or second structure, spaced from the first upper aircraft component while only requiring one hinge and one fastening arrangement. As a result, the clamp accommodates smaller spaces, weighs less, has fewer parts, results in faster installation, and eliminates unreachable or hard to access areas. Further, a web between the two rings enhances structural stability of the clamp.

Figure 1A:
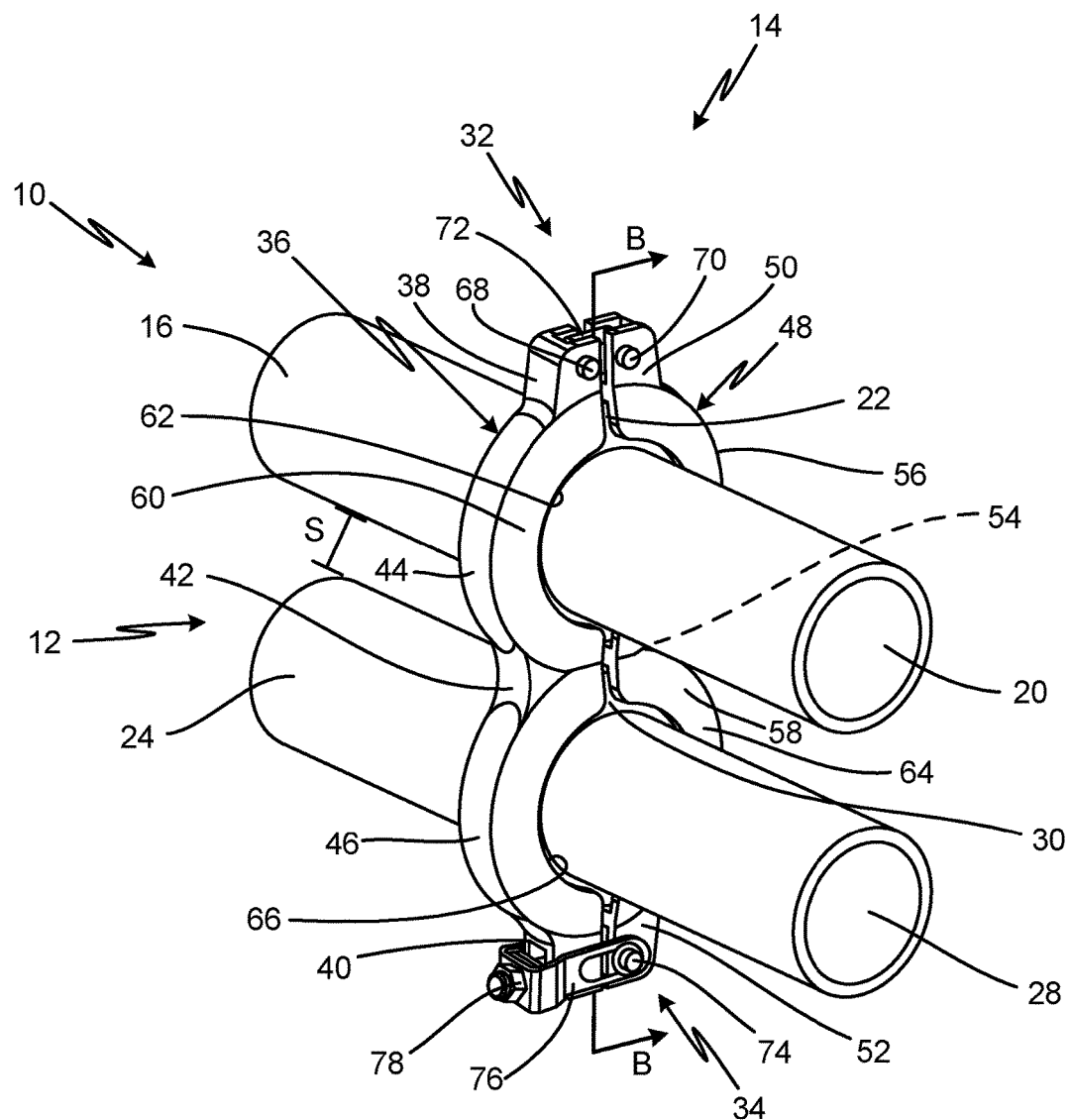
FIG. 1A is a perspective view of a double V-band clamp on a first aircraft component and a separate second aircraft component.
Figure 1B:
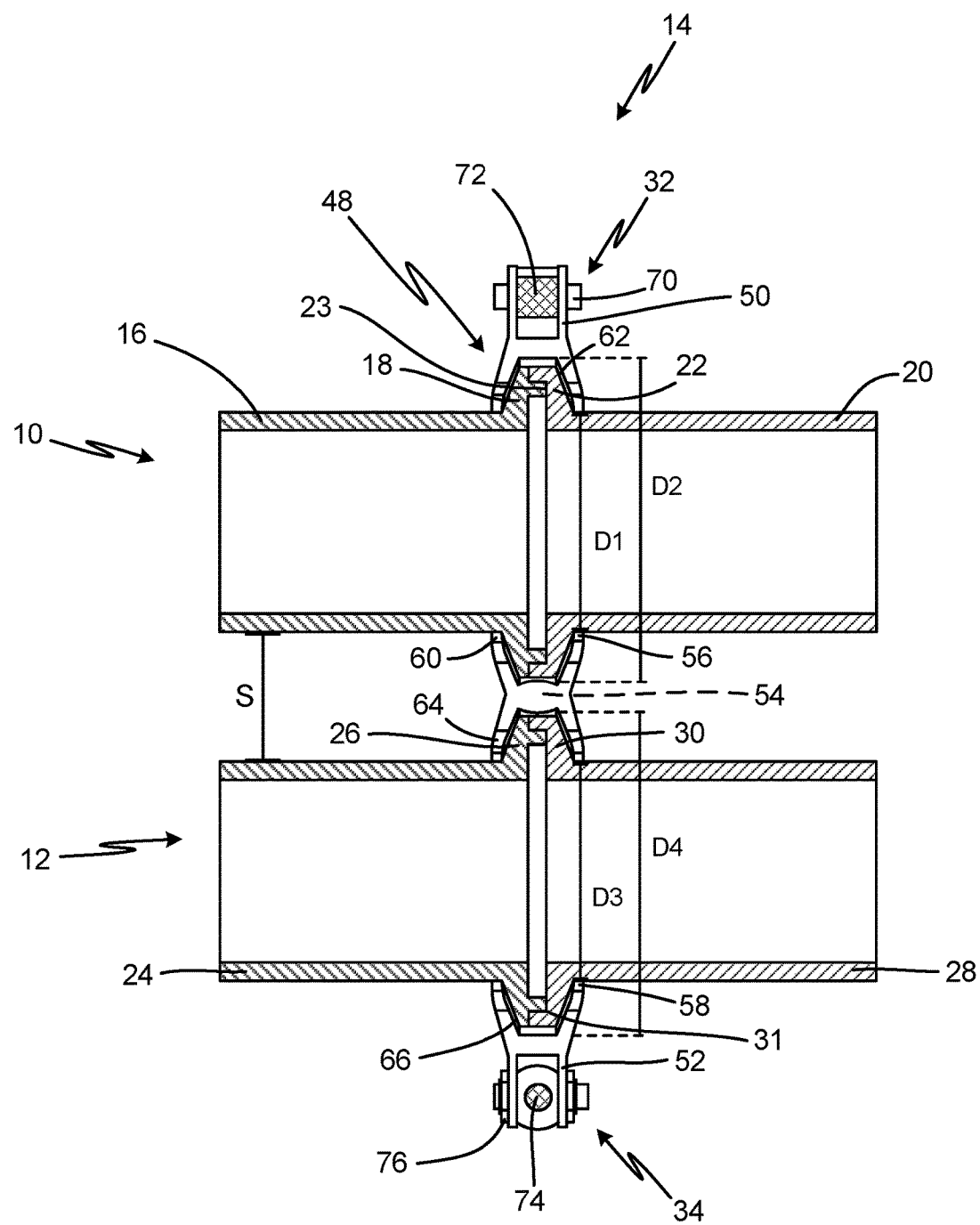
FIG. 1B is a cross-sectional view of the double V-band clamp on the first aircraft component and the separate second aircraft component taken along line B-B of FIG. 1A.

FIG. 1A is a perspective view of a clamp assembly, or double V-band clamp, 14 on first aircraft component 10 and separate second aircraft component 12. FIG. 1B is a cross-sectional view of double V-band clamp 14 on first aircraft component 10 and separate second aircraft component 12 taken along line B-B of FIG. 1A. FIGS. 1A and 1B will be discussed together.

First aircraft component, or first structure, 10 includes first tube 16 having first flange 18 (shown in FIG. 1B), second tube 20 having second flange 22, and seal 23. Second aircraft component, or second structure, 12 includes third tube 24 having third flange 26 (shown in FIG. 1B), fourth tube 28 having fourth flange 30, and seal 31. Double V-band clamp 14 includes hinge 32, fastening arrangement 34, first arm 36 (shown in FIG. 1A) (which includes first hinge end 38, first free end 40, first web 42, first curved portion 44, and second curved portion 46), second arm 48 (which includes second hinge end 50, second free end 52, second web 54, third curved portion 56, and fourth curved portion 58), first ring 60 defining first space 62, and second ring 64 defining second space 66. Hinge 32 includes left pin 68 (shown in FIG. 1A), right pin 70, and link 72. Fastening arrangement 34 includes bolt 74, connector 76, and nut 78 (shown in FIG. 1A).

First aircraft component, or upper aircraft component, 10 is separated from second aircraft component, or lower aircraft component, 12 by space S. First aircraft component 10 is parallel to second aircraft component 12. In this embodiment, first aircraft component 10 is equal in diameter to second aircraft component 12. First aircraft component 10 and second aircraft component 12 are positioned within double V-band clamp 14.

First aircraft component 10 has first tube, or rear portion, 16 at a rear of first aircraft component 10. First tube 16 is tube-like. In this embodiment, first tube 16 is a duct. In alternate embodiments, first tube 16 may be any suitable aircraft component. First flange 18 is connected at a front end of first tube 16. First flange 18 has a male profile. First aircraft component 10 has second tube, or front portion, 20 at a front of upper aircraft component 10. Second tube 20 is tube-like. In this embodiment, second tube 20 is a duct that mates with first tube 16. In alternate embodiments, second tube 20 may be any suitable aircraft component that mates with first tube 16. Second flange 22 is connected at a rear end of second tube 20. Second flange 22 has a female profile. First tube 16 and second tube 20 are separate, axially aligned portions of first aircraft component 10 having about the same diameter, and first flange 18 and second flange 22 are shaped to interlock. When first flange 18 and second flange 22 are interlocked, an annular space is formed between first flange 18 and second flange 22 that is radially outward from inner diameters of the tube-like portions of first tube 16 and second tube 20. Seal 23 may be positioned between first flange 18 and second flange 22.

Second aircraft component 12 has third tube, or rear portion, 24 at a rear of second aircraft component 12. Third tube 24 is tube-like. In this embodiment, third tube 24 is a duct. In alternate embodiments, third tube 24 may be any suitable aircraft component. Third flange 26 is connected at a front end of third tube 24. Third flange 26 has a male profile. Second aircraft component 12 has fourth tube, or front portion, 28 at a front of second aircraft component 12. Fourth tube 28 is tube-like. In this embodiment, fourth tube 28 is a duct that mates with third tube 24. In alternate embodiments, fourth tube 28 may be any suitable aircraft component that mates with third tube 24. Fourth flange 30 is connected at a rear end of fourth tube 28. Fourth flange 30 has a female profile. Third tube 24 and fourth tube 28 are separate, axially aligned portions of second aircraft component 12 having about the same diameter, and third flange 26 and fourth flange 30 are shaped to interlock. When third flange 26 and fourth flange 30 are interlocked, an annular space is formed between third flange 26 and fourth flange 30 that is radially outward from inner diameters of the tube-like portions of third tube 24 and fourth tube 28. Seal 31 may be positioned between third flange 26 and fourth flange 30.

Double V-band clamp 14 has hinge 32 at a first, or upper, end of double V-band clamp 14 and fastening arrangement 34 at a second, or lower, end of double V-band clamp 14. First, or left, arm 36 extends from hinge 32 to fastening arrangement 34. First arm 36 is a single unitary piece. First arm 36 may be made of nickel alloy, stainless steel, aluminum, non-metallic material, or any other suitable material. First arm 36 has first hinge end, or upper end portion, 38 connected to hinge 32, and first free end, or lower end portion, 40 connectable to fastening arrangement 34. First, or left, web 42 of first arm 36 is located between first hinge end 38 and first free end 40. In this embodiment, first web 42 is triangular. In alternate embodiments, first web 42 may be any suitable shape. First curved portion, or upper curved portion, 44 of first arm 36 is connected to first hinge end 38 and first web 42 such that first curved portion 44 is between first hinge end 38 and first web 42. First curved portion 44 has a V-shaped cross-section. Second curved portion, or lower curved portion, 46 of first arm 36 is connected to first free end 40 and first web 42 such that second curved portion 46 is between first free end 40 and first web 42. As such, first web 42 is between first curved portion 44 and second curved portion 46. In this embodiment, a first, or upper, end of second curved portion 46 is also connected to a second, or lower, end of first curved portion 44. In alternate embodiments, first web 42 may extend all the way between second curved portion 46 and first curved portion 44 such that second curved portion 46 does not contact first curved portion 44. As such, the distance between first curved portion 44 and second curved portion 46 varies based on the application in which double V-band clamp 14 is utilized. Second curved portion 46 has a V-shaped cross-section.

Second, or right, arm 48 extends from hinge 32 to fastening arrangement 34. Second arm 48 is a single unitary piece. Second arm 48 may be made of nickel alloy, stainless steel, aluminum, non-metallic material, or any other suitable material. Second arm 48 has second hinge end, or upper end portion, 50 connected to hinge 32, and second free end, or lower end portion, 52 connectable to fastening arrangement 34. Second, or right, web 54 of second arm 48 is located between second hinge end 50 and second free end 52. In this embodiment, second web 54 is triangular. In alternate embodiments, second web 54 may be any suitable shape. Third curved portion, or upper curved portion, 56 of second arm 48 is connected to second hinge end 50 and second web 54 such that third curved portion 56 is between second hinge end 50 and second web 54. Third curved portion 56 has a V-shaped cross-section. Fourth curved portion, or lower curved portion, 58 of second arm 48 is connected to second free end 52 and second web 54 such that fourth curved portion 58 is between second free end 52 and second web 54. As such, second web 54 is between third curved portion 56 and fourth curved portion 58. In this embodiment, a first, or upper, end of fourth curved portion 58 is also connected to a second, or lower, end of third curved portion 56, the distance between fourth curved portion 58 and third curved portion 56 of second arm 48 being equal to the distance between second curved portion 46 and first curved portion 44 of first arm 36. In alternate embodiments, second web 54 may extend all the way between fourth curved portion 58 and third curved portion 56 such that fourth curved portion 58 does not contact third curved portion 56. As such, the distance between third curved portion 56 and fourth curved portion 58 varies based on the application in which double V-band clamp 14 is utilized. Fourth curved portion 58 has a V-shaped cross-section.

In this embodiment, first hinge end 38 and second hinge end 50 both have U-shaped cross-sections such that a space is formed between first hinge end 38 and second hinge end 50. In alternate embodiments, first hinge end 38 and second hinge end 50 may have any suitable shape. In this embodiment, first free end 40 and second free end 52 are shaped to form a slot that extends between first free end 40 and second free end 52. In alternate embodiments, first free end 40 and second free end 52 may have any suitable shape.

First curved portion 44 of first arm 36 and third curved portion 56 of second arm 48 form first ring, or upper ring, 60. Due to the V-shaped cross-sections of first curved portion 44 and third curved portion 56, first ring 60 has first inner diameter D1 and second inner diameter D2. Second inner diameter D2 is greater than first inner diameter D1. First inner diameter D1 of first ring 60 is between about 1 inch (2.54 centimeters) and about 12 inches (30.48 centimeters). First ring 60 defines first space, or upper space, 62. First space 62 is at a center of first ring 60. First ring 60 is configured to fit around first flange 18 of first tube 16 of first aircraft component 10 and second flange 22 of second tube 20 of first aircraft component 10. More specifically, first curved portion 44 and third curved portion 56 have V-shaped cross-sections that hold first flange 18 of first tube 16 and second flange 22 of second tube 20. As such, first space 62 is sized to accommodate first tube 16 and second tube 20 of first aircraft component 10.

Second curved portion 46 of first arm 36 and fourth curved portion 58 of second arm 48 form second ring, or lower ring, 64. Due to the V-shaped cross-sections of second curved portion 46 and fourth curved portion 58, second ring 64 has first inner diameter D3 and second inner diameter D4. Second inner diameter D4 is greater than first inner diameter D3. First inner diameter D3 of lower ring 64 is between about 1 inch (2.54 centimeters) and about 12 inches (30.48 centimeters). In this embodiment, first inner diameter D3 equals first inner diameter D1, and second inner diameter D4 equals second inner diameter D2. In alternate embodiments, first inner diameters D1 and D3 may not be equal and second inner diameters D2 and D4 may not be equal. Second ring 64 defines second space, or lower space, 66. Second space 66 is at a center of second ring 64. Second ring 64 is configured to fit around third flange 26 of third tube 24 of second aircraft component 12 and fourth flange 30 of fourth tube 28 of second aircraft component 12. More specifically, second curved portion 46 and fourth curved portion 58 have V-shaped cross-sections that hold third flange 26 of third tube 24 and fourth flange 30 of fourth tube 28. As such, second space 66 is sized to accommodate third tube 24 and fourth tube 28 of second aircraft component 12. In this embodiment, first ring 60 and second ring 64 are the same size. In alternate embodiments, first ring 60 and second ring 64 are different sizes. First ring 60 and second ring 64 are located in a common plane.

Hinge 32 pivotably connects first hinge end 38 of first arm 36 and second hinge end 50 of second arm 48. Hinge 32 has left pin 68 positioned in first hinge end 38 of first arm 36. Left pin 68 extends through an opening in a front of first hinge end 38 and an opening in a rear of first hinge end 38. Right pin 70 of hinge 32 is positioned in second hinge end 50 of second arm 48. Right pin 70 extends through an opening in a front of second hinge end 50 and an opening in a rear of second hinge end 50. Link 72 extends between first hinge end 38 of first arm 36 and second hinge end 50 of second arm 48. More specifically, link 72 is positioned in the space formed by first hinge end 38 and second hinge end 50. Link 72 is connected to left pin 68 and right pin 70. Left pin 68 is positioned in an opening extending through a left portion of link 72, and right pin 70 is positioned in an opening extending through a right portion of link 72. As such, link 72 connects left pin 68 and right pin 70 of hinge 32. Thus, link 72 connects first arm 36 and second arm 48. In alternate embodiments, hinge 32 may be any suitable hinge.

Fastening arrangement 34 can releasably connect first free end 40 of first arm 36 to second free end 52 of second arm 48. Fastening arrangement 34 has bolt 74 positionable within the slot defined by first free end 40 of first arm 36 and second free end 52 of second arm 48. In this embodiment, bolt 74 is a T-bolt. Bolt 74 has a right portion positionable through openings in second free end 52 of second arm 48. The right portion of bolt 74 extends through an opening in a front of second free end 52 and an opening in a rear of second free end 52. A left portion of bolt 74 extends through the slot defined by second free end 52 and first free end 40 such that the left portion of bolt 74 extends past first free end 40. In alternate embodiments, bolt 74 may be any suitable bolt or fastening arrangement 34 may not include bolt 74. Connector 76 is U-shaped and extends from a front of second free end 52 around first free end 40 to a rear of second free end 52. A front end of connector 76 is positioned around a front end of the right portion of bolt 74 and a rear end of connector 76 is positioned around a rear end of the right portion of bolt 74. The left portion of bolt 74 extends through connector 76. In alternate embodiments, fastening arrangement 34 may not include connector 76. Nut 78 is positionable on the left portion of bolt 74 that extends past first free end 40 and connector 76. In this embodiment, nut 78 is a self-locking nut. In alternate embodiments, nut 78 may be any suitable nut. In alternate embodiments, fastening arrangement 34 may be any suitable fastening device.

Double V-band clamp 14 is used to clamp first tube 16 to second tube 20 and to clamp third tube 24 to fourth tube 28. First arm 36 and second arm 48, specifically free ends 40 and 52, are separated from each other by pivoting first arm 36 and/or second arm 48 along left pin 68 and/or right pin 70, respectively, of hinge 32. Separating first arm 36 and second arm 48 opens double V-band clamp 14. Thus, double V-band clamp 14 opens like a clamshell. Once double V-band clamp 14 is placed in an open position, double V-band clamp 14 is positioned around first flange flange 18 and second flange 22 of first tube 16 and second tube 20 of first aircraft component 10 and around third flange 26 and fourth flange 30 of third tube 24 and fourth tube 28 of second aircraft component 12.

First free end 40 of first arm 36 and second free end 52 of second arm 48 are then joined together by moving left arm and/or second arm 48 by pivoting first arm 36 and/or second arm 48 along left pin 68 and/or right pin 70, respectively, to place double V-band clamp 14 in a closed position. In a closed position, double V-band clamp 14 has first ring 60 that surround first aircraft component 10 and second ring 64 that surround second aircraft component 12. More specifically, first curved portion 44 and third curved portion 56 encircle first aircraft component 10, and second curved portion 46 and fourth curved portion 58 encircle second aircraft component 12. As such, first aircraft component 10 is located in first space 62, and second aircraft component 12 is located in second space 66. First flange 18 and second flange 22 extend past inner diameter D1 of first ring 60 into a space formed by the V-shaped cross-section of first curved portion 44 and third curved portion 56, and third flange 26 and fourth flange 30 extend past inner diameter D3 of second ring 64 into a space formed by the V-shaped cross-section of second curved portion 46 and fourth curved portion 58. As a result, closing double V-band clamp 14 secures first flange 18 and second flange 22 together and secures third flange 26 and fourth flange 30 together.

Once double V-band clamp 14 is in a closed position, first free end 40 is connected to second free end 52 at fastening arrangement 34. Bolt 74 is positioned to extend into the slot formed by second free end 52 and first free end 40. Nut 78 is positioned on a left end portion of bolt 74, and a wrench is used to move nut 78 closer to first free end 40 along threading of bolt 74, tightening bolt 74. As bolt 74 is tightened, second free end 52 of second arm 48 and first free end 40 of first arm 36 are drawn closer together. Tightening bolt 74 clamps first tube 16 to second tube 20 and third tube 24 to fourth tube 28. Tightening bolt 74 also moves first flange 18 closer to second flange 22 and third flange 26 closer to fourth flange 30 to seal first tube 16 and second tube 20 and third tube 24 and fourth tube 28. More specifically, first flange 18 and second flange 22 and third flange 26 and fourth flange 30 fit snugly into curved portions 44 and 56 and 46 and 58 between first inner diameters D1 and D3 and second inner diameters D2 and D3 of first ring 60 and second ring 64, respectively. As such, V-shaped cross-sections apply an axial load of first flange 18 toward second flange 22 and an axial load of third flange 26 toward fourth flange 30. The axial loads cause sealing engagement between first flange 18 and second flange 22 and between third flange 26 and fourth flange 30. As a result, first tube 16 and second tube 20 and third tube 24 and fourth tube 28 are forced together in sealing engagement.

As a result, fluid flows from first tube 16 to second tube 20, or from second tube 20 to first tube 16 without leaking between first flange 18 and second flange 22, and fluid flows from third tube 24 to fourth tube 28, or from fourth tube 28 to third tube 24, without leaking between third flange 26 and fourth flange 30. Double V-band clamp 14 is particularly useful for high temperature and pressure applications because it is shaped to provide a tight seal and can be made of nickel alloy, stainless steel, aluminum, non-metallic material, or any other suitable material.

First web 42 and second web 54 act as stiffeners, or reinforcing structures, for double V-band clamp 14. Thus, double V-band clamp 14 is capable of withstanding tightening of bolt 74. As such, first web 42 and second web 54 prevent double V-band clamp 14 from bending as bolt 74 is being tightened. First web 42 and second web 54 have a thickness that provides proper stiffness for a particular application in which double V-band clamp 14 is being utilized. As such, first web 42 and second web 54 may even protrude out as far as a tangent to first aircraft component 10 and second aircraft component 12 without interfering with other aircraft components.

Double V-band clamp 14 joins first flange 18 and second flange 22 of first tube 16 and second tube 20 of first aircraft component 10 and joins third flange 26 and fourth flange 30 of third tube 24 and fourth tube 28 of second aircraft component 12 using a single hinge 32 and a single fastening arrangement 34.

Traditional V-band clamps include one ring between a hinge and a fastener, and can be too bulky for some configurations where multiple clamps are needed in a small space. Because double V-band clamp 14 has first ring 60 and second ring 64 between a single hinge 32 and a single fastening arrangement 34, double V-band clamp 14 requires less space and can therefore fasten components together in areas with space constraints. For example, because space S between first aircraft component 10 and second aircraft component 12 is small, there may not be sufficient room to attach separate clamps to each of first aircraft component 10 and second aircraft component 12. Using double V-band clamp 14, two separate aircraft components 10 and 12 can be clamped at the same time in the same space, including in the same plane, reducing the amount of space required for clamping the two aircraft components.

Further, because double V-band clamp 14 has only one fastening arrangement 34, and thus only requires one area of access for fastening, double V-band clamp accommodates clamping in otherwise unreachable or hard to access areas during design, manufacturing, and installation. For example, a user may be unable to get a hand or tool to a far side of a tight space in which components require clamping. Double V-band clamp 14 can be positioned such that fastening arrangement 34 is accessible at the near side of the space and a hand or tool is not required to reach the far side of the space.

Additionally, because double V-band clamp 14 has only one fastening arrangement 34 that requires fastening for clamping both first aircraft component 10 and second aircraft component 12, double V-band clamp 14 allows for easier and faster installation or assembly. Double V-band clamp 14 also has a reduced number of parts and weighs less.

Space S between first aircraft component 10 and second aircraft component 12 can be reduced as well because neither a hinge nor a fastener is required between first ring 60 and second ring 64, the aircraft components thus taking up less overall volume.

Because double V-band clamp 14 has first curved portion 44 and third curved portion 56 and second curved portion 46 and fourth curved portion 58 with V-shaped cross-sections, flanges 18 and 22 and 26 and 30 fit snugly into curved portions 44 and 56 and 46 and 58, forcing first tube 16 and second tube 20 and third tube 24 and fourth tube 28 together in sealing engagement. As a result, clamping with double V-band clamp 14 results in low leakage in high temperature and pressure applications.

Webs 42 and 54 enhance structural stability of double V-band clamp 14. Thus, double V-band clamp 14 is stiff enough to clamp both first aircraft component 10 and second aircraft component 12 properly.

While double V-band clamp 14 on first aircraft component 10 and second aircraft component 12 has been discussed using the terms "upper", "lower", "left", "right", "front", and "back" to describe the orientation shown in FIG. 1, double V-band clamp 14 may be placed, or installed, in any orientation, such as a horizontal orientation or an intermediate orientation, based on the relative positions of first and second aircraft components 10 and 12. As such, the components of the double V-band clamp 14 may be in a different orientation than that shown in FIG. 1 and thus the locations of "upper", "lower", "left", "right", "front", and "back" may vary.

Figure 2:
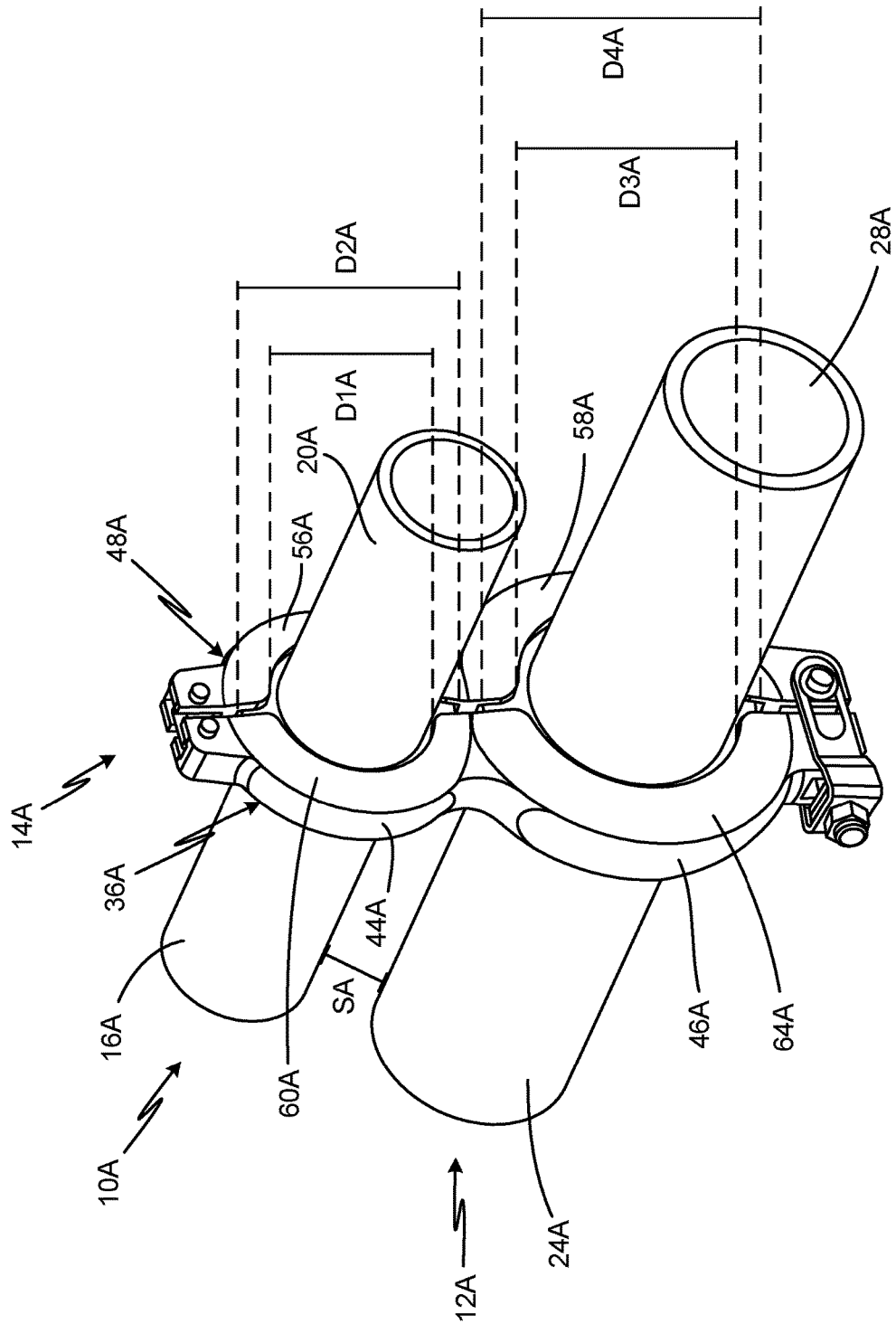
FIG. 2 is a perspective view of a second embodiment of a double V-band clamp on a first aircraft component and a separate second aircraft component having a different size.

FIG. 2 is a perspective view of a second embodiment of double V-band clamp 14A on first aircraft component 10A and separate second aircraft component 12A having a different size. First aircraft component 10A includes first tube 16A and second tube 20A. Second aircraft component 12A includes third tube 24A and fourth tube 28A. Double V-band clamp 14A includes first arm 36A (which includes first curved portion 44A and second curved portion 46A), second arm 48A (which includes third curved portion 56A and fourth curved portion 58A), first ring 60A, and second ring 64A.

In this embodiment, first aircraft component 10A is not equal in diameter to second aircraft component 12A. For example, first aircraft component 10A may be about 1.5 inches (3.81 centimeters) in diameter while second aircraft component 12A may be about 2.0 inches (5.08 centimeters) in diameter. As such, double V-band clamp 14A has the same structure and function as double V-band clamp 14, except that first curved portion 44A and third curved portion 56A form first ring 60A, which is a different size than second ring 64A formed by second curved portion 46A and fourth curved portion 58A.

First curved portion 44A of first arm 36A and third curved portion 56A of second arm 48A form first ring 60A. Due to the V-shaped cross-sections of first curved portion 44A and third curved portion 56A, first ring 60A has first inner diameter D1A and second inner diameter D2A. Second inner diameter D2A is greater than first inner diameter D1A. First inner diameter D1A of first ring 60A may be about 1.5 inches (3.81 centimeters). First ring 60A is configured to fit around first tube 16A of first aircraft component 10A and second tube 20A of first aircraft component 10A.

Second curved portion 46A of first arm 36A and fourth curved portion 58A of second arm 48A form second ring 64A. Due to the V-shaped cross-sections of second curved portion 46A and fourth curved portion 58A, second ring 64A has first inner diameter D3A and second inner diameter D4A. Second inner diameter D4A is greater than first inner diameter D3A. First inner diameter D3A of second ring 64A may be about 2.0 inches (5.08 centimeters). In this embodiment, first inner diameter D3A does not equal first inner diameter D1A, and second inner diameter D4A does not equal second inner diameter D2A. Second ring 64 is configured to fit around third tube 24A of second aircraft component 12A and fourth tube 28A of second aircraft component 12A.

Because first ring 60A and second ring 64A are different sizes, double V-band clamp 14A can clamp two separate aircraft components 10A and 12A having different sizes at the same time in the same space, including in the same plane. As such, double V-band clamp 14A can be used in areas having space constraints and different-sized aircraft components, which may otherwise require two separate clamps.

Discussion of Possible Embodiments

The following are non-exclusive descriptions of possible embodiments of the present invention.

A clamp assembly includes a first arm including: a first hinge end; a first free end; a first web between the first hinge end and the first free end; a first curved portion between the first hinge end and the first web; and a second curved portion between the first free end and the first web; a second arm including: a second hinge end; a second free end; a second web between the second hinge end and the second free end; a third curved portion between the second hinge end and the second web; and a fourth curved portion between the second free end and the second web; a hinge that pivotably connects the first hinge end to the second hinge end; and a fastening arrangement configured to connect the first free end to the second free end when the clamp assembly is in a closed position; wherein the first curved portion and the third curved portion are configured to encircle a first structure when the clamp assembly is in the closed position and the second curved portion and the fourth curved portion are configured to encircle a second structure when the clap assembly is in the closed position.

The clamp assembly of the preceding paragraph can optionally include, additionally and/or alternatively, any one or more of the following features, configurations and/or additional components:

The first curved portion, the second curved portion, the third curved portion, and the fourth curved portion each have a V-shaped cross-section.

The V-shaped cross-sections of the first and third curved portions are configured to hold a first flange of a first tube to a second flange of a second tube and V-shaped cross-sections of the second and fourth curved portions are configured to hold a third flange of a third tube to a fourth flange of a fourth tube.

The V-shaped cross-sections of the first curved portion and the third curved portion are configured to apply an axial load of the first flange toward the second flange, and the V-shaped cross-sections of the second curved portion and the fourth curved portion are configured to apply an axial load of the third flange toward the fourth flange when the clamp assembly is in a closed position.

The axial loads are configured to cause sealing engagement between the first flange and the second flange and the third flange and the fourth flange.

The fastening arrangement is configured to releasably connect the first free end to the second free end.

The first web and the second web act as a stiffener for the clamp assembly.

The fastening arrangement includes: a slot defined by the first free end and the second free end; a bolt positionable within the slot; and a nut positionable on the bolt.

The bolt is a T-bolt having a portion positionable within an opening in the second free end.

The hinge includes: a left pin positioned in the first hinge end; a right pin positioned in the second hinge end; and a link connecting the left pin and the right pin.

The clamp assembly includes a single hinge and a single fastening arrangement.

A first ring formed by the first curved portion and the third curved portion and a second ring formed by the second curved portion and the fourth curved portion are the same size.

A first ring formed by the first curved portion and the third curved portion and a second ring formed by the second curved portion and the fourth curved portion are different sizes.

A first ring formed by the first curved portion and the third curved portion has a first inner diameter between about 1 inch (2.54 centimeters) and about 12 inches (30.48 centimeters), and a second ring formed by the second curved portion and the fourth curved portion has a first inner diameter between about 1 inch (2.54 centimeters) and about 12 inches (30.48 centimeters).

A first ring forced by the first curved portion and the third curved portion and a second ring formed by the second curved portion and the fourth curved portion are in the same plane.

The first arm is a single unitary piece and the second arm is a single unitary piece.

A method of clamping axially aligned portions of a first structure and axially aligned portions of a second structure includes separating a first free end of a first arm and a second free end of a second arm of a hinged clamp assembly to place the clamp assembly in an open position; positioning the first arm and the second arm of the clamp assembly in the open position around flanges of a first tube and a second tube of the first structure and around flanges of a third tube and a fourth tube of the second structure, the second structure being spaced from the first structure; joining the first free end and the second free end together such that a first curved portion of the first arm and a third curved portion of the second arm encircle the first structure and a second curved portion of the first arm and a fourth curved portion of the second arm encircle the second structure, placing the clamp assembly in a closed position; and connecting the first free end to the second free end at a fastening arrangement.

The method of the preceding paragraph can optionally include, additionally and/or alternatively, any one or more of the following features, configurations and/or additional components:

Connecting the first free end to the second free end includes positioning a bolt into a slot formed by the first free end and the second free end.

Tightening the bolt to clamp a first tube and a second tube of the first structure together and to clamp a third tube and a fourth tube of the second structure together.

Tightening the bolt seals the first tube and the second tube of the first aircraft component and seals the third tube and the fourth tube of the second aircraft component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A clamp assembly comprising:
   a first arm including:
      a first hinge end;

a first free end;
a first web between the first hinge end and the first free end;
a first curved portion between the first hinge end and the first web; and
a second curved portion between the first free end and the first web;
a second arm including:
a second hinge end;
a second free end;
a second web between the second hinge end and the second free end;
a third curved portion between the second hinge end and the second web; and
a fourth curved portion between the second free end and the second web;
a hinge that pivotably connects the first hinge end to the second hinge end; and
a fastening arrangement configured to connect the first free end to the second free end when the clamp assembly is in a closed position;
wherein the first curved portion and the third curved portion are configured to encircle a first structure when the clamp assembly is in the closed position and the second curved portion and the fourth curved portion are configured to encircle a second structure when the clamp assembly is in the closed position; and
wherein the first curved portion, the second curved portion, the third curved portion, and the fourth curved portion each have a V-shaped cross-section, each V-shaped cross-section including angled sides and a flat bottom portion.

2. The clamp assembly of claim 1, wherein the V-shaped cross-sections of the first and third curved portions are configured to hold a first flange of a first tube to a second flange of a second tube and V-shaped cross-sections of the second and fourth curved portions are configured to hold a third flange of a third tube to a fourth flange of a fourth tube.

3. The clamp assembly of claim 1, wherein the V-shaped cross-sections of the first curved portion and the third curved portion are configured to apply an axial load of the first flange toward the second flange, and the V-shaped cross-sections of the second curved portion and the fourth curved portion are configured to apply an axial load of the third flange toward the fourth flange when the clamp assembly is in a closed position.

4. The clamp assembly of claim 3, wherein the axial loads are configured to cause sealing engagement between the first flange and the second flange and the third flange and the fourth flange.

5. The clamp assembly of claim 1, wherein the fastening arrangement is configured to releasably connect the first free end to the second free end.

6. The clamp assembly of claim 1, wherein the first web and the second web act as a stiffener for the clamp assembly.

7. The clamp assembly of claim 1, wherein the fastening arrangement includes:
a slot defined by the first free end and the second free end;
a bolt positionable within the slot; and
a nut positionable on the bolt.

8. The clamp assembly of claim 7, wherein the bolt is a T-bolt having a portion positionable within an opening in the second free end.

9. The clamp assembly of claim 1, wherein the hinge includes:
a left pin positioned in the first hinge end;
a right pin positioned in the second hinge end; and
a link connecting the left pin and the right pin.

10. The clamp assembly of claim 1, wherein the clamp assembly includes a single hinge and a single fastening arrangement.

11. The clamp assembly of claim 1, wherein a first ring formed by the first curved portion and the third curved portion and a second ring formed by the second curved portion and the fourth curved portion are a same size.

12. The clamp assembly of claim 1, wherein a first ring formed by the first curved portion and the third curved portion and a second ring formed by the second curved portion and the fourth curved portion are different sizes.

13. The clamp assembly of claim 1, wherein a first ring formed by the first curved portion and the third curved portion has a first inner diameter between about 1 inch (2.54 centimeters) and about 12 inches (30.48 centimeters), and a second ring formed by the second curved portion and the fourth curved portion has a first inner diameter between about 1 inch (2.54 centimeters) and about 12 inches (30.48 centimeters).

14. The clamp assembly of claim 1, wherein a first ring forced by the first curved portion and the third curved portion and a second ring formed by the second curved portion and the fourth curved portion are in a same plane.

15. The clamp assembly of claim 1, wherein the first arm is a single unitary piece and the second arm is a single unitary piece.

16. A method of clamping axially aligned portions of a first structure and axially aligned portions of a second structure, the method comprising:
separating a first free end of a first arm and a second free end of a second arm of a hinged clamp assembly to place the clamp assembly in an open position;
positioning the first arm and the second arm of the clamp assembly in the open position around flanges of a first tube and a second tube of the first structure and around flanges of a third tube and a fourth tube of the second structure, the second structure being spaced from the first structure;
joining the first free end and the second free end together such that a first curved portion of the first arm and a third curved portion of the second arm encircle the first structure and a second curved portion of the first arm and a fourth curved portion of the second arm encircle the second structure, placing the clamp assembly in a closed position, wherein the first curved portion, the second curved portion, the third curved portion, and the fourth curved portion each have a V-shaped cross-section, each V-shaped cross-section including angled sides and a flat bottom portion; and
connecting the first free end to the second free end at a fastening arrangement.

17. The method of claim 16, wherein connecting the first free end to the second free end includes positioning a bolt into a slot formed by the first free end and the second free end.

18. The method of claim 17, further including tightening the bolt to clamp a first tube and a second tube of the first structure together and to clamp a third tube and a fourth tube of the second structure together.

19. The method of claim 18, wherein tightening the bolt seals the first tube and the second tube of the first structure and seals the third tube and the fourth tube of the second structure.

* * * * *